(12) United States Patent
Osborne et al.

(10) Patent No.: US 8,574,540 B2
(45) Date of Patent: Nov. 5, 2013

(54) PROCESS FOR MANUFACTURING PREFLUXED METAL OXIDE FROM METAL HYDROXIDE AND METAL CARBONATE PRECURSORS

(75) Inventors: Geoffrey Edwin Osborne, Stoney Creek (CA); Ahmed Vahed, Oakville (CA); Samuel Walton Marcuson, Mississauga (CA)

(73) Assignee: Vale S.A., Rio de Janeiro (BR)

( * ) Notice: Subject to any disclaimer, the term of this patent is extended or adjusted under 35 U.S.C. 154(b) by 782 days.

(21) Appl. No.: 12/366,768

(22) Filed: Feb. 6, 2009

(65) Prior Publication Data
US 2009/0208405 A1    Aug. 20, 2009

Related U.S. Application Data

(60) Provisional application No. 61/027,058, filed on Feb. 8, 2008, provisional application No. 61/045,311, filed on Apr. 16, 2008.

(51) Int. Cl.
*C01G 53/04* (2006.01)
*C01G 51/04* (2006.01)

(52) U.S. Cl.
USPC ............. 423/594.3; 423/594.5; 423/594.19

(58) Field of Classification Search
USPC ............ 423/592.1, 593.1, 594.3, 594.5; 106/789, 792, 796, 799; 148/22–24; 75/626–629
See application file for complete search history.

(56) References Cited

U.S. PATENT DOCUMENTS

| 2002/0037455 A1 | 3/2002 | Tani et al. |
| 2005/0020446 A1 * | 1/2005 | Choudhary et al. .......... 502/407 |
| 2008/0039318 A1 | 2/2008 | Turaga et al. |

FOREIGN PATENT DOCUMENTS

| CA | 1143166 | 3/1980 |
| CA | 2405951 | 10/2001 |

(Continued)

OTHER PUBLICATIONS

Andrews, L. "Factors affecting nickel recovery from slags produced during platinum", *Transactions of the Institutions of Mining and Metallurgy, Section C: Mineral Processing and Extractive Metallurgy*, vol. 114, Issue 3, Sep. 2005, pp. C130-C134.

*Primary Examiner* — Steven Bos
*Assistant Examiner* — Justin Bova
(74) *Attorney, Agent, or Firm* — Arent Fox, LLP

(57) ABSTRACT

A method for producing prefluxed metal oxide from a metal salt selected from nickel hydroxide, cobalt hydroxide, mixed nickel-cobalt hydroxide, nickel carbonate, cobalt carbonate, mixed nickel-cobalt carbonate and combinations thereof includes providing a mixture of at least one slag making oxide and a metal salt selected from the group consisting of nickel hydroxide, cobalt hydroxide, mixed nickel-cobalt hydroxide, nickel carbonate, cobalt carbonate, mixed nickel-cobalt carbonate and combinations thereof, blending with a binder, blending in a flux additive to form a slag-making mixture, forming the slag-making mixture into prefluxed agglomerates, and calcining the prefluxed agglomerates to produce a prefluxed metal oxide. An agglomerate is provided which includes a metal salt selected from nickel hydroxide, cobalt hydroxide, mixed nickel-cobalt hydroxide, nickel carbonate, cobalt carbonate, mixed nickel-cobalt carbonate and combinations thereof, a slag making oxide, and a flux additive. An agglomerate is provide which includes a metal oxide selected from nickel oxide and cobalt oxide, and slag, wherein the metal oxide is encapsulated in the slag.

24 Claims, 6 Drawing Sheets

(56) References Cited

FOREIGN PATENT DOCUMENTS

| | | |
|---|---|---|
| JP | 2005-002395 | 1/2005 |
| KR | 0811872 B1 | 3/2008 |
| WO | WO 2006002443 | 9/2005 |
| WO | WO 2006009358 | 2/2006 |
| WO | WO 2006/089358 A1 | 8/2006 |
| WO | WO 2006089358 | 8/2006 |
| WO | WO 2008/022381 A1 | 2/2008 |
| WO | WO 2008022381 | 2/2008 |
| WO | WO 2008/075879 A1 | 6/2008 |

\* cited by examiner

PROCESS FOR MANUFACTURING PREFLUXED METAL OXIDE FROM METAL HYDROXIDE AND METAL CARBONATE PRECURSORS

CROSS-REFERENCE TO RELATED APPLICATIONS

This application claims priority to U.S. Provisional Application No. 61/027,058 filed Feb. 8, 2008, and U.S. Provisional Application No. 61/045,311 filed Apr. 16, 2008, the contents of which are incorporated herein by reference in their respective entireties.

BACKGROUND

1. Technical Field

Techniques for transformation of metal hydroxide and metal carbonate to metal oxide.

2. Description of Related Art

Nickel and cobalt have traditionally been recovered from sulfide and oxide sources by both pyrometallurgical and hydrometallurgical techniques, with pyrometallurgical processing usually applied to the source feed (ore or concentrate) and hydrometallurgical methods employed for the final steps of metal refining. Trends over the last 10-15 years have witnessed increased application of hydrometallurgical technologies for direct treating of the source nickel/cobalt containing feeds. These would typically begin with an acid leach, followed by solution purification steps leading to the production of intermediates (hydroxides, sulfides, carbonates), which would be further hydrometallurgically refined as required, or to the production of final metal products by electrowinning.

More recent developments have demonstrated the application of pyrometallurgical processes to refined hydrometallurgical solutions or intermediates for the production of the final product. Pyrometallurgical techniques typically involve drying, calcining/reduction and electric furnace smelting which produces ferro-nickel or nickel sulphide matte, which may be further processed to recover purified nickel. Pyrometallurgical techniques are usually applied to saprolite. Hydrometallurgical techniques are more typically applied to limonitic laterites. These techniques include the Caron process, high-pressure acid leaching (HPAL) with sulfuric acid at high temperature and high pressure, and atmospheric leaching, e.g., heap leaching with sulfuric acid at atmospheric temperature and pressure. Following leaching, the leachate is suitably neutralized to remove impurities such as Fe and Al, which is then followed by precipitation of a mixed Ni/Co intermediate, such as hydroxide, carbonate or sulphide, or the solution is subjected to solvent extraction or ion-exchange for the further removal of impurities (such as manganese) and/or the separation of nickel from cobalt. Nickel hydroxide may be produced from acidic nickel sulfate solutions produced as eluates, strip solutions, or raffinates from solvent extraction or ion exchange treatment. Nickel hydroxide may be subject to further processing and, e.g., be transformed into nickel oxide.

WO 2006/089358 describes a process for the production of ferronickel from a mixed nickel iron hydroxide product which includes providing a mixed nickel iron hydroxide product; pelletizing the mixed nickel iron hydroxide product to produce nickel iron hydroxide pellets; calcining the nickel iron hydroxide pellets to produce mixed nickel iron oxide pellets; and reducing the nickel iron oxide pellets with one or more reducing gases at high temperatures to produce ferronickel pellets. As described therein, the mixed nickel iron hydroxide product would generally be in the form of a wet cake and to pelletize the mixed nickel iron hydroxide product, the wet cake is dried and pelletized with an organic binding material and water. Organic binding materials discussed therein are "a cellulose solution, starch or other viscous organic hydrocarbon polymers which are destroyed when temperatures exceed 500° C." The pelletized nickel iron hydroxide product is first dried at a temperature of about 100° C.-120° C. and then calcined at temperatures of about 800° C.-1300° C. under oxidizing conditions to convert the nickel iron hydroxide pellets to nickel iron oxide pellets substantially free of sulfur. See also, WO 2008/022381.

SUMMARY

A method for making a prefluxed metal oxide is provided which includes providing a slag making oxide and a metal salt selected from the group consisting of nickel hydroxide, cobalt hydroxide, mixed nickel-cobalt hydroxide, nickel carbonate, cobalt carbonate and combinations thereof, mixing the metal salt with a binder, blending in a flux additive to form a slag-making mixture, optionally adding water, forming the mixture into agglomerates, drying the agglomerates, and calcining the dried agglomerates to produce prefluxed nickel oxide and/or cobalt oxide.

Also provided is a method for making a metal oxide which includes providing a laterite leachate precipitate containing a metal salt selected from the group consisting of nickel hydroxide, cobalt hydroxide, mixed nickel-cobalt hydroxide, nickel carbonate, cobalt carbonate, mixed nickel-cobalt carbonate and combinations thereof, blending the precipitate with a binder, blending in a flux additive to form a slag-making mixture with at least one slag-making oxide in the precipitate, forming the mixture into agglomerates, and calcining the agglomerates to produce a prefluxed metal oxide selected from the group consisting of nickel oxide, cobalt oxide and combinations thereof.

Also provided is an agglomerate which includes a metal salt selected from the group consisting of nickel hydroxide, cobalt hydroxide, mixed nickel-cobalt hydroxide, nickel carbonate, cobalt carbonate, mixed nickel-cobalt carbonate and combinations thereof, a slag making oxide, and a flux additive. The flux additive may be selected from the group consisting of $SiO_2/CaO$, $SiO_2/Al_2O_3$ and combinations thereof.

Also provided is an agglomerate which includes a metal oxide selected from the group consisting of nickel oxide and cobalt oxide; and slag, wherein the metal oxide is encapsulated in the slag.

DETAILED DESCRIPTION OF PREFERRED EMBODIMENTS

Prefluxed metal oxide agglomerates of nickel oxide or cobalt oxide are produced according to the present disclosure that are well-suited for further processing into nickel or cobalt for use, e.g., in manufacturing stainless steel or superalloys. The metal oxide agglomerates produced herein are cohesive and of low friability, thus avoiding finely pulverized metal oxide powders, which are known to be hazardous. The present disclosure allows production of nickel or cobalt metal from a semi-purified leach solution without extensive and costly refining and allows rejection of harmful impurities into the slag/gas and the recovery of nickel and/or cobalt into a byproduct stream. The process herein is applicable to any semi-purified leach liquor containing nickel and/or cobalt in which impurity metals detrimental to intended nickel or cobalt usage have been removed, e.g., Cu, Zn, Mn. The present process increases operating efficiencies associated with use of nickel or cobalt by incorporating flux addition at the agglomeration stage, rather than at the reduction stage, thus simplifying operation of reduction-smelting or melting furnaces. As used herein, "pellets", "extrudates", briquettes, "granular" and "granules" are used interchangeably, notwithstanding the possibility that each may have a different shape, density and/or size. The term "agglomerates" is intended to encompass pellets, extrudates, briquettes, granular and granules, but not be limited thereto. The term "extrudate" is intended to encompass any product resulting from an extrusion process.

Figure 1:
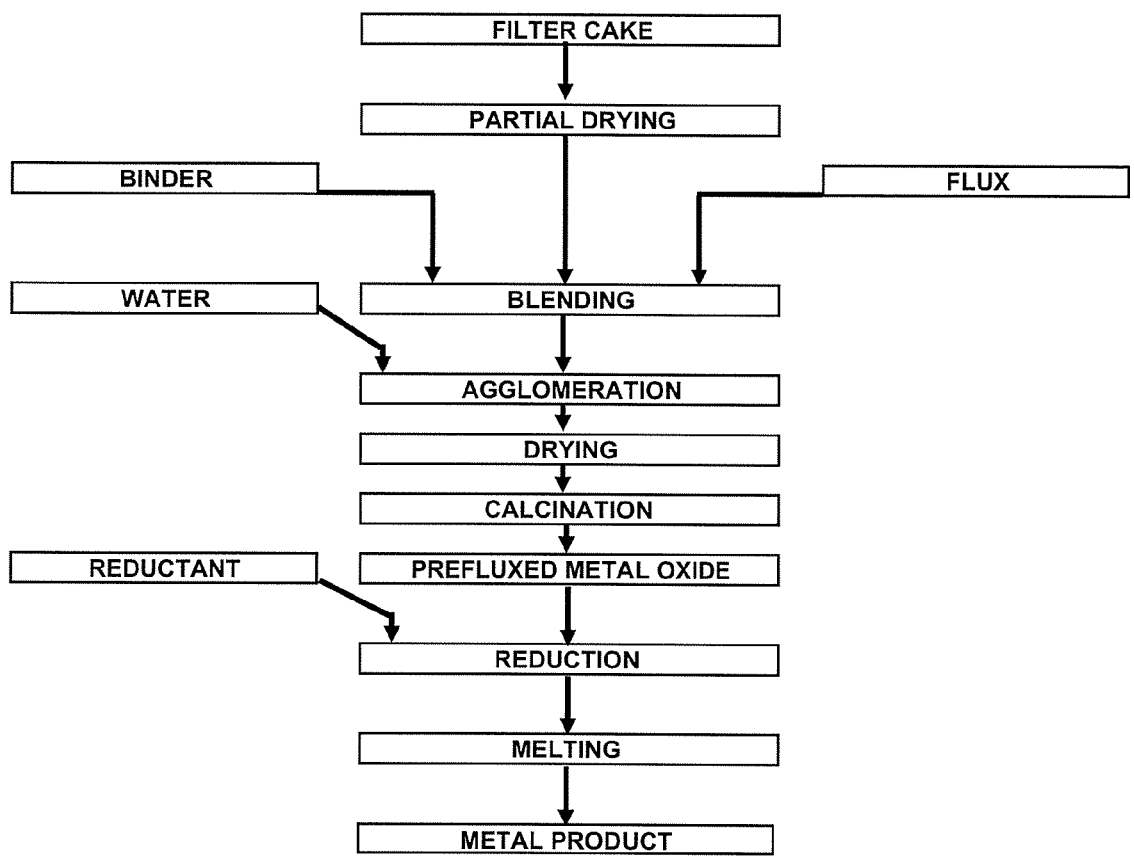
FIG. 1 is a flow chart of a process for producing and using prefluxed metal oxide according to one embodiment of the present disclosure.

A flow chart depicting an embodiment of a process according to the present disclosure is illustrated in FIG. 1. In general, a metal salt product which can be nickel hydroxide product (NHP), cobalt hydroxide product (CHP) or both (MHP), nickel carbonate product (NCP), cobalt carbonate product (CCP), or both (MCP) in the form of a filter cake is at least partially dried and blended with one or more binders and one or more fluxes. The resulting mixture is then subjected to agglomeration, optionally dried and calcined. The result is prefluxed metal oxide, which can be subjected to further refining such as reduction and melting, or smelting. The process is described in more detail below. Unless otherwise specified, "metal salt" is intended to mean any or all of nickel hydroxide, cobalt hydroxide or both (MHP), nickel carbonate, cobalt carbonate, or both (MCP).

Any known leaching method or leach solution purification method may be used to provide metal salt for use in the present process as long as the metal salt does not contain impurities which are detrimental to the intended final use of the metal product. For example, NHP precipitate, CHP precipitate, NCP precipitate, CCP precipitate can be produced from laterite ore by various hydrometallurgical leaching processes. In one instance, a process for producing a purified nickel hydroxide precipitate starts with a nickel-containing leach solution having impurities including at least one of manganese, copper, zinc, iron and cobalt. The nickel-containing leach solution is treated, preferably under limited oxygen ingress conditions, at atmospheric pressure, with at least one base (such as, but not limited to, calcium oxide, calcium hydroxide, magnesium oxide) to form a slurry containing a mixed hydroxide precipitate and a low-nickel barren solution. The slurry is then thickened to form a mixed hydroxide precipitate filter cake, and the filter cake is washed to remove entrained barren solution. The washed mixed hydroxide filter cake is then contacted with acid (such as, but not limited to, sulfuric acid) to dissolve nickel and other metals contained in the filter cake to produce a concentrated nickel-containing solution of higher nickel concentration than was in the nickel-containing leach solution. The higher nickel concentration solution is then subjected to solvent extraction with an organic acid extractant to remove metals other than nickel from that nickel-containing solution, and form a solvent extraction raffinate of purified nickel solution. This purified nickel solution is then treated with a suitable base (such as, but not limited to, magnesium oxide) to form purified nickel hydroxide precipitate slurry. The nickel in the slurry is typically present as nickel hydroxide and basic nickel sulfate. The slurry is then thickened to form a nickel hydroxide precipitate filter cake, and the filter cake is washed to remove entrained barren solution. It should be understood that any method known to those with skill in the art may be used to provide metal salt for use in connection with the present disclosure.

NHP, CHP, NCP or CCP precipitate, no matter how produced, can be dried to a level that will allow for the addition of liquid binders without becoming too fluid. Alternatively, when blending the metal salt precipitate with dry additives, the precipitate should be sufficiently dried to become a free flowing powder suitable for dry powder blending. The choice of moisture level will depend on the method of agglomeration to be used. The precipitate may be pressure filtered or vacuum filtered to create a relatively low moisture cake and dried to become a free flowing powder, e.g., to a moisture content ranging from about 15% to about 30% by weight, about 18% to about 28% by weight, about 20% to about 25% by weight, or about 20% by weight. It is preferable to avoid hardening of the wet metal salt filter cake, which can be accomplished by promptly drying the precipitate after precipitation. Suitable temperatures for drying can range, e.g., from about 90° C. to about 110° C. After drying, the precipitate should be delumped or milled to create a maximum particle size, e.g., −10 mesh. In one embodiment, milling the precipitate to smaller than about 200 mesh in a hammer mill can facilitate pelletizing. Other size meshes can be utilized as well.

Figure 2:
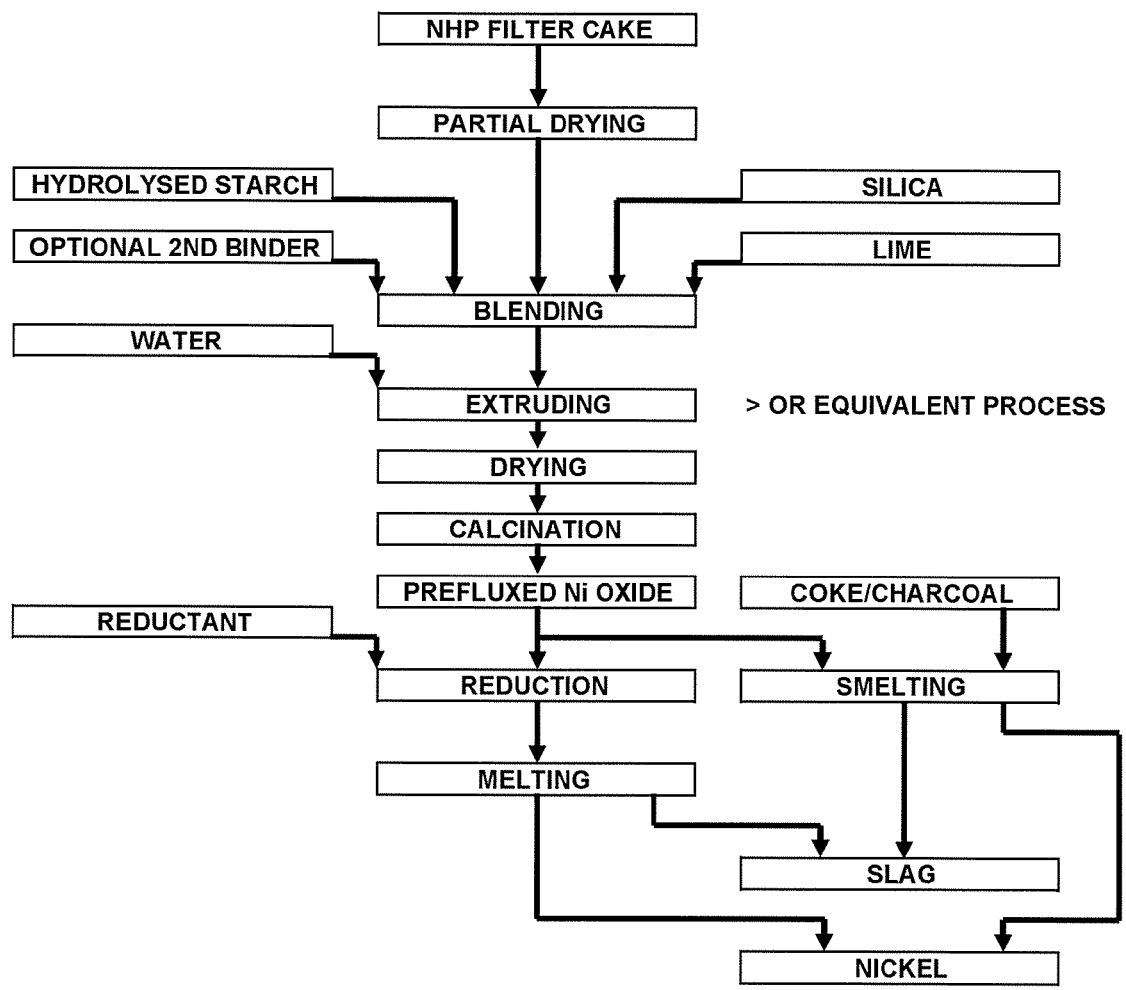
FIG. 2 is a flow chart of a process for producing and using prefluxed nickel oxide according to another embodiment of the present disclosure.
Figure 3:
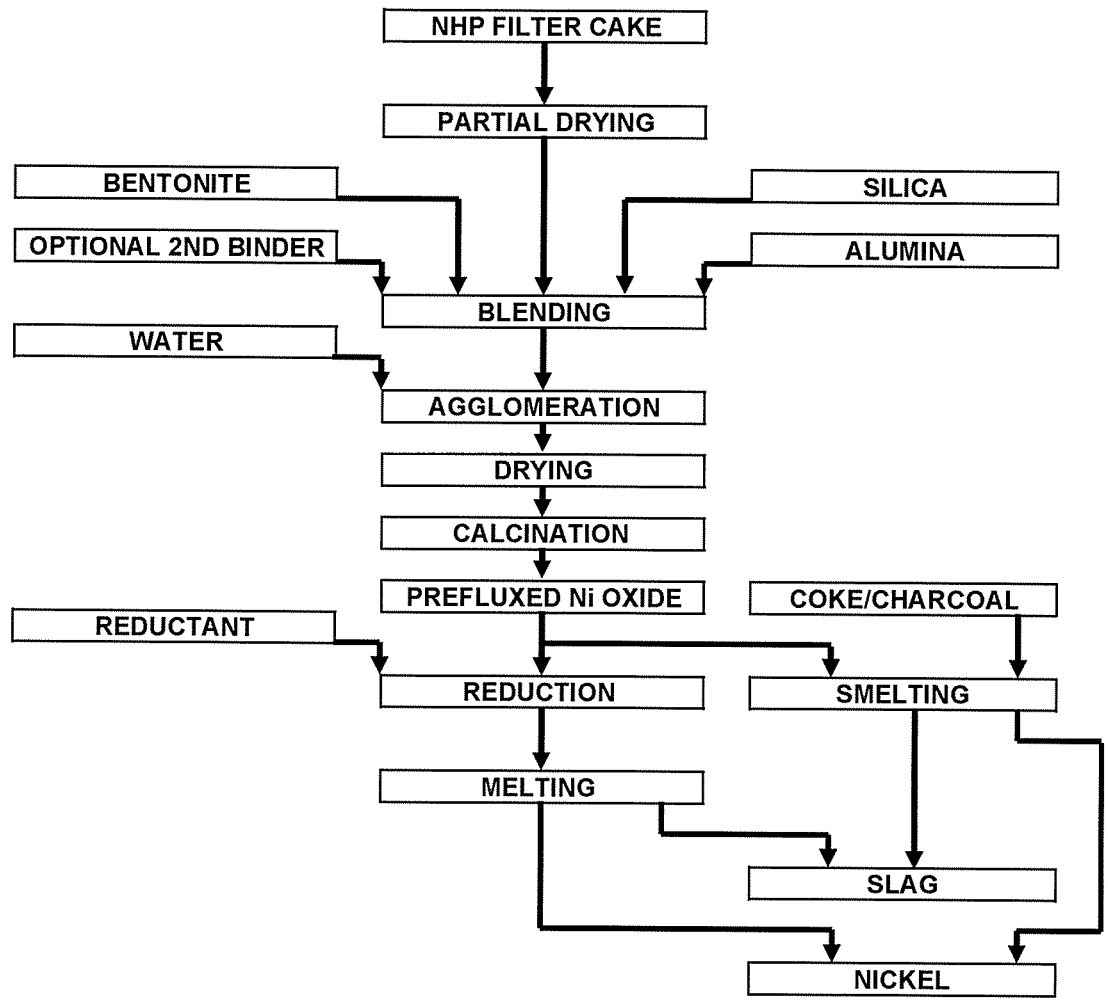
FIG. 3 is a flow chart of a process for producing and using prefluxed nickel oxide according to yet another embodiment of the present disclosure.

At this stage, a binder may be added to the dried precipitate. In one embodiment, an aqueous solution of a binder such as hydrolyzed starch, molasses, sugar, carboxymethylcellulose or cellulose is blended with the precipitate. These are relatively low temperature binders, which may be added at concentrations ranging from about 2% to about 10% by weight of the NHP, CHP, NCP or CCP (dry basis). A process utilizing hydrolyzed starch is depicted in FIG. 2. Examples of intermediate temperature binders are glycerol triacetate or polyethylene glycol, which may be added at concentrations ranging from about 2% to about 5% by weight of the metal salt (dry basis). It is contemplated that the low temperature binders may be used alone or in combination with the intermediate temperature binders to a total concentration of about 15%, preferably 10% by weight of the metal salt (dry basis). Similarly, the intermediate temperature binders can be used alone or in combination with the low temperature binders. Concentration of aqueous solutions of binders may range from about 5 to about 80% dry binder in water. In another embodiment, one or more binders that are dry powders may be blended with metal salt precipitate. Examples of such powder binders are bentonite, lignin, guar gum and pregelatinized starch. A process utilizing bentonite is depicted in FIG. 3. Concentration of powder binders may range from about 2% to about 10% by weight metal salt (dry basis). For example, about 3% to about 6% of each powder binder alone or in combination. In another embodiment, a combination of binders in aqueous solution as described above is combined with dry powder binders to form a blend with metal salt precipitate. The binders are utilized to aid in agglomeration and provide adequate green strength to agglomerates or pellets formed from these blends.

Figure 4:
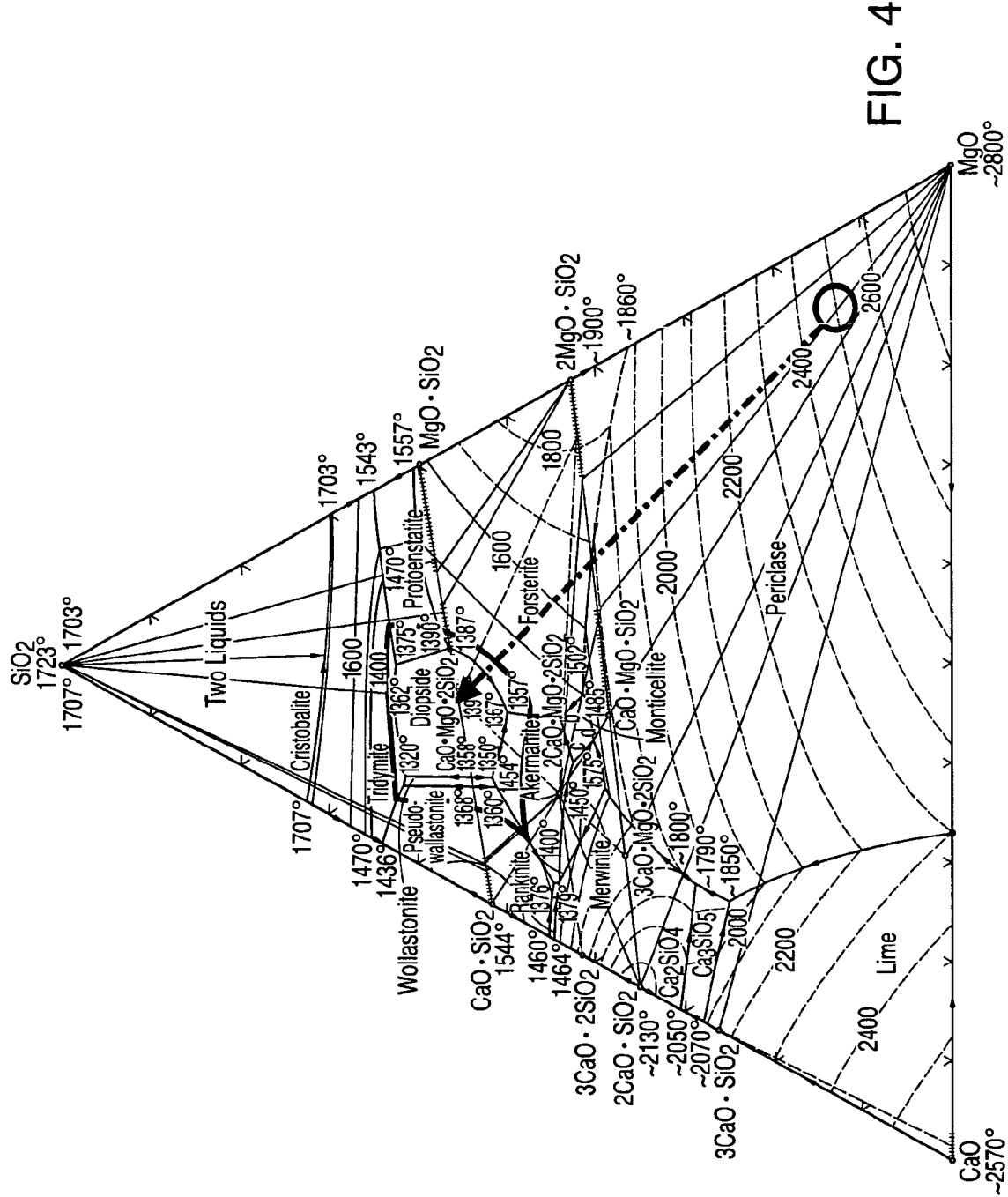
FIG. 4 is a liquidus surface for the $MgO$—$CaO$—$SiO_2$ system showing the effect of flux addition on a slag composition according to one embodiment of the present disclosure.
Figure 6:
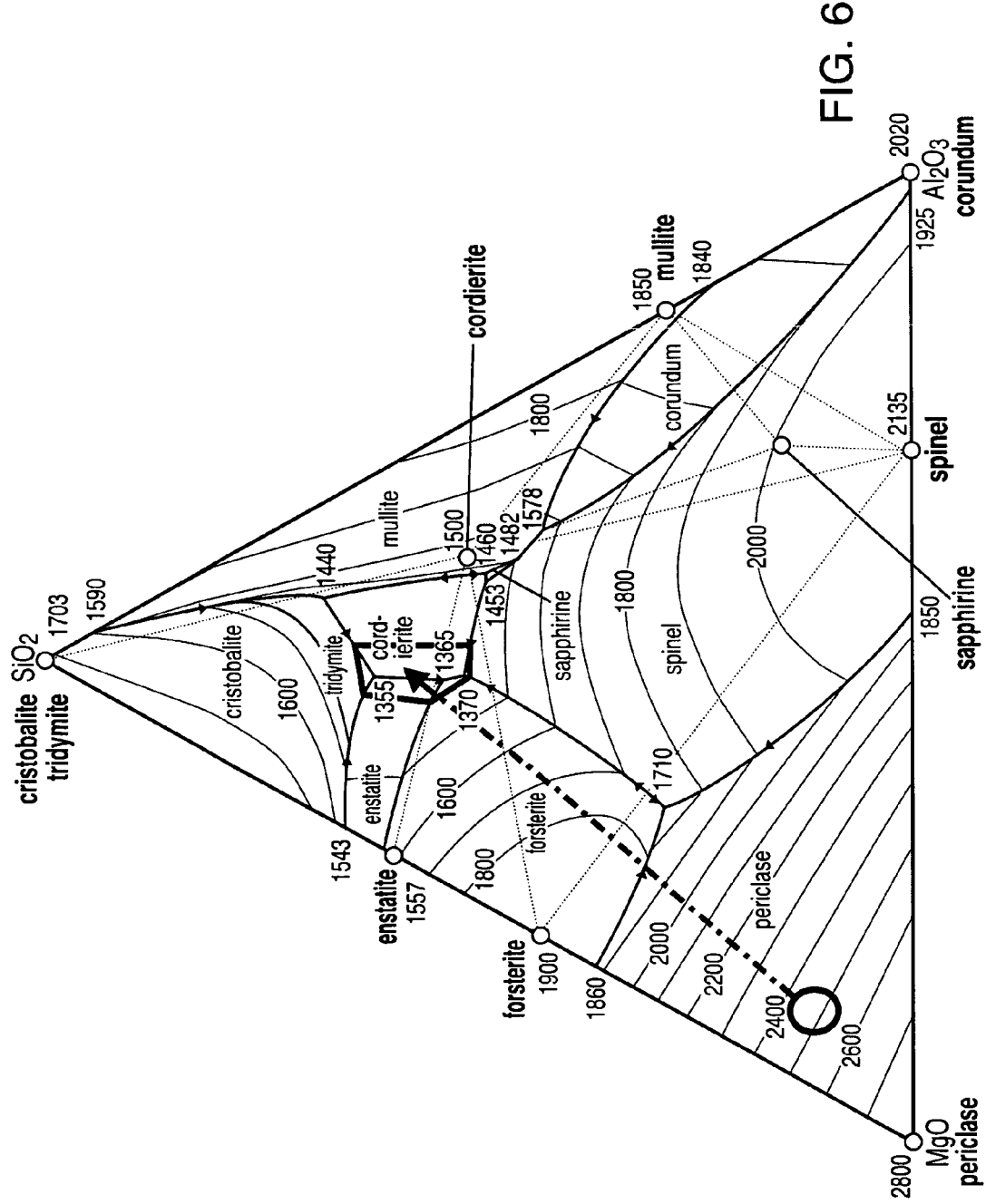
FIG. 6 is a liquidus surface for the $MgO—Al_2O_3—SiO_2$ system showing the effect of flux addition on a slag composition according to one embodiment of the present disclosure.

A flux is added, either before or after, or simultaneously with the above described binder, to the metal salt precipitate in a quantity sufficient to form a slag with slag-making oxides, which are present in the metal salt precipitate, e.g., MgO, CaO In one embodiment, the flux is a finely pulverized mixture of silica and lime, or other commercially available form thereof, which, in combining slag-making oxides, forms a fluid slag. The flux mixture is selected using a diagram showing the liquidus surface for a slag system, such as the one shown in FIG. 4. In FIG. 4, the composition of the NHP slag-making constituents lie near the circled area and the flux is used to modify the slag composition to the zone in which the liquidus temperature is below 1400° C. as indicated by the arrow. The slag formed in the agglomerates should have a melting range that is compatible both with the calcining temperature and the eventual smelting temperature in contact with molten nickel. Flux addition should be tailored to create a low softening temperature to provide good adhesion of metal oxide particles and a slag with a liquidus temperature consistent with smelting operations. Thus, in one embodiment, addition of flux should preferably dissolve all the MgO present and provide a low solidus temperature, preferably 1350° C. or less, which provides good slag bonding during the calcining of the metal salt agglomerates. In one embodiment, flux addition is proportional to the Mg content of the NHP precipitate feed and is sufficient to form a slag assaying about 10% to about 25% MgO by weight, and more preferably about 20% MgO by weight. In one embodiment, the flux is ground $SiO_2$/CaO to form a fluid slag in a ratio ranging from about 1.9 to about 2.2 parts $SiO_2$ to 1 part CaO. For example, about a 2:1 mass ratio. In another embodiment, ground $SiO_2$/$Al_2O_3$ flux in a ratio of from about 2 to about 2.5 parts $SiO_2$ to about 1 part $Al_2O_3$ may be used to form slag at, e.g., a 2.3:1 ratio in the MgO—$Al_2O_3$—$SiO_2$ system. The flux mixture is selected using a diagram showing the liquidus surface for a slag system, such as the one shown in FIG. 6. In FIG. 6, the composition of the NHP slag-making constituents lie near the circled area and the flux is used to modify the slag composition to the zone in which the liquidus temperature is below 1500° C. as indicated by the arrow. It should be understood that other fluxes that fulfill the same function or fluxes to suit a desired final slag composition can be utilized.

The metal salt/binder/flux mixture is formed into agglomerates, which may optionally be dried to develop sufficient strength for handling. The agglomeration method depends on the desired size of the final calcined material, and can be selected from pelletizing, extrusion, micropelletizing, pin mixing, briquetting or spray drying. Water may be added to reduce the viscosity of the metal salt/binder/flux mixture prior to agglomeration to facilitate ease in handling. For example, a pasty consistency is desirable for extrusion. Those skilled in the art are capable of routinely determining sufficient amounts of water to form pastes of desired consistency. A paste can be used to create extrudates of any size, but thickness is, e.g., about 1 mm to about 8 mm. Thicker agglomerates may be more susceptible to thermal spalling and may require longer residence times. Notwithstanding that, thicker agglomerates, e.g., about 7 mm pellets up to about 20 mm may be used in accordance with the disclosure herein. If the selected method of agglomeration is pelletizing, the mixture can generally be left as a free-flowing powder until it is fed to a pelletizing device. While pellet size may have an impact on cold crushing strength (larger pellets can typically be stronger), it also can depend on other factors such as residence time on a pelletizing wheel. Differences in residence time for two similarly sized pellets can result in different densities, as pellets with a shorter residence time would be "fluffier" or more porous, while pellets with a longer residence time would be denser, compacted by weight of the pellets on the disc or wheel. Use of a pin mixer can produce irregularly shaped granules that may be handled with low dusting rates. The amount of moisture in the green agglomerates can be variable and may range, e.g., from about 20% to about 35% by weight. As mentioned above, the agglomerates may be dried to improve their strength and to remove free moisture prior to calcining to less than 5% moisture. Drying temperatures may range, e.g., from about 90° C. to about 110° C.

The agglomerates are then calcined in contact with air at a temperature that suits the specific composition of the selected slag. In accordance with the present disclosure, a calcined agglomerate is produced with adequate strength for mechanical handling and shipping without hazardous excessive dusting of metal oxide. In certain embodiments sulfur can be removed from the agglomerates for applications requiring low sulfur content. NHP precipitate contains some basic sulfate which can be thermally decomposed at temperatures over 1000° C., e.g., about 1250° C. and removed under oxidizing conditions. A preferred calcining temperature is greater than about 1300° C. and less than about 1500° C. Sulfur removal efficiencies of over 99.8% have been demonstrated, resulting in final assays of 0.005% sulfur after calcining at about 1380° C. to about 1400° C. In one embodiment, the temperature may range from about 1350° C. to about 1400° C. for about 30 minutes. About 1390° C. to about 1400° C. has also been found to be suitable. Other combinations of temperature and time may be used, according to specific requirements to produce a calcined product with specific properties. Those skilled in the art are familiar with techniques to achieve these conditions. For example, green agglomerates are charged to a rotary hearth furnace (RHF) via an inclined chute for feeding. Mechanical shock combined with thermal shock may result in some breakage of the hearth layer of agglomerates. Accordingly, it is recommended, but not required, that vertical drop should not exceed 1 meter. In one embodiment using a RHF, the minimum temperature of the pellets on the hearth layer is about 1300° C. and the maximum temperature on the top surface of the bed is about 1450° C.-1460° C. In order to reach a temperature of about 1450° C. in the freeboard, the temperature can be set about 100° C. to about 150° C. higher, i.e., about 1550° C. to about 1600° C. It is advantageous to keep the calcining temperature as uniform as possible throughout the agglomerate. Any other suitable reactor may be used, e.g., a kiln, traveling grate, shaft furnace, multi-hearth furnace. Oxidizing conditions are provided by addition of air or other oxidizing gases within the reactor.

It should be understood that drying, prior to calcining, can be accomplished in a separate drier with subsequent transfer of the dried agglomerates into a calcining vessel for subsequent calcining. Alternatively, the agglomerates can be dried and calcined in the same vessel.

As mentioned above, calcined nickel oxide agglomerate is produced according to the present disclosure which reduces hazardous nickel oxide dust. To accomplish this, the green agglomerates reach a temperature which is sufficient for the formation and fusion of slag from the MgO and fluxes contained in the mixture. In essence, when heated above a temperature of about 1200° C., the flux/MgO mixture at least partially melts and acts as a cement to keep the agglomerates together. In the calcined agglomerates, the nickel oxide particles are encapsulated in slag. This provides excellent strength and also entraps the nickel oxide to significantly reduce the potential for release of fine nickel oxide powder to the environment. The slag component of the calcined agglomerates should also be compatible with the eventual smelting operation in contact with molten nickel. The $SiO_2$—CaO—MgO slag system contains a region with liquidus temperatures between about 1350° C. and about 1400° C., which results in a fluid slag at the operating temperature of the smelting furnace. The $SiO_2$—$Al_2O_3$—MgO system also contains a similar region with a fluid slag at 1450-1500° C. Either slag system can be used. It should be understood that calcined metal oxide agglomerates produced in accordance with the present disclosure include cobalt oxide agglomerates in which the cobalt oxide is encapsulated in slag.

The agglomerates can lose about 35% of their mass during calcining, primarily due to decomposition of hydroxides and sulfates. This translates into significant shrinkage in size of the agglomerates during calcining. See, e.g., FIGS. 5A and 5B which are lined for color.

Metal oxide agglomerates produced according to the present disclosure are suitable for further processing. In one embodiment, the calcined agglomerates consist of nickel oxide embedded in a slag phase. To make metallic nickel, the nickel oxide is reduced. This can be done either by reduction smelting in an electric furnace with a solid reductant such as coke or charcoal to produce molten nickel and molten slag, as shown in FIG. 3, or can be done in two stages by first reducing in the solid state using either solid or gaseous reductant and then melting the reduced agglomerates in order to separate the slag from the metal, as shown in FIG. 2. Solid state reduction using a reducing gas at a temperature less than the melting point of the components in the agglomerates can be performed, and then followed by simple smelting to separate the metal from the slag. Examples of gaseous reductants are hydrogen, carbon monoxide, mixtures thereof, and any gasified hydrocarbon fuel or gaseous fuel, e.g., methane.

Figure 5B:
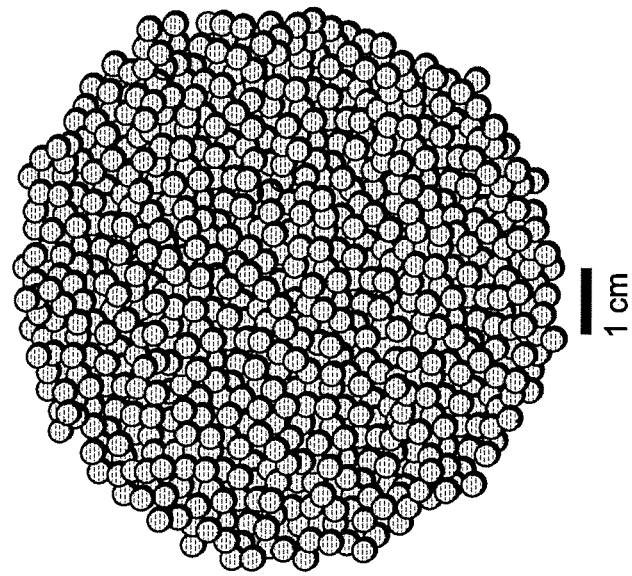
FIGS. 5A and 5B are drawings depicting the appearance of nickel hydroxide agglomerates and transformed nickel oxide agglomerates according to another embodiment of the present disclosure.
Figure 5A:
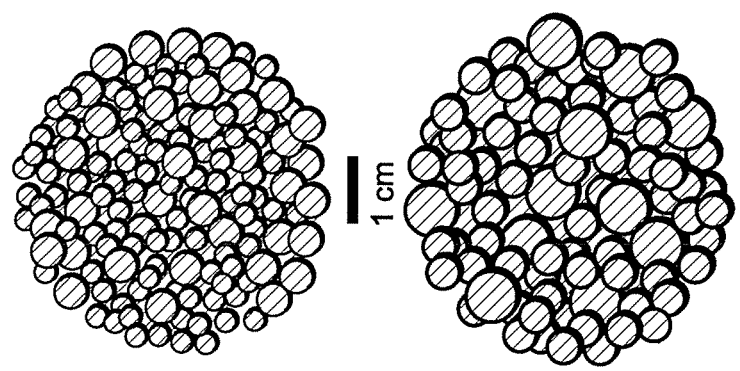

Table I contains the bench scale results of a test using bentonite and guar gum binders with a $SiO_2$/CaO flux using pelletization. Assays of the calcined pellets are shown in the column labeled "OXIDIZED". Assays of calcined pellets that have been reduced in the solid state are shown in the column labeled "REDUCED". The assays of the metal and slag produced by the reduction smelting of calcined pellets are shown in the columns labeled "SMELTED" and "Metal" and "Slag". Physical results of example NH-32 are illustrated in FIGS. 5A and 5B. FIG. 5A depicts the appearance of pelletized agglomerates made of NHP, 2% by weight bentonite and 2% by weight lignin, 8% by weight $SiO_2$ and 4% by weight CaO. FIG. 5B depicts the appearance of the resulting pelletized nickel oxide agglomerates after calcining the pelletized NHP agglomerates at 1390° C. in air for 0.5 hour.

TABLE I

| Test Number | | NH33-NHP | | | | | |
|---|---|---|---|---|---|---|---|
| Binder name | | bent + guar | | | | | |
| Binder quantity | Wt. % on NHP | 3 + 3 | | | | | |
| Flux addition* | Wt. % on NHP | 11 | | | | | |
| Coke | Wt. % on calcine | | | | 10 | | |
| Peak temperature | ° C. | | | 1390 | 1550 | | 1000 |
| Dwell at peak temperature | h | | | 0.5 | 0.5 | | 1 |
| Atmosphere | | | | Air | $N_2$/CO/$CO_2$ | | $H_2$ |

| | | | | | SMELTED | | |
|---|---|---|---|---|---|---|---|
| Assays, % | | AS-REC'D | GREEN | OXIDIZED | Metal | Slag | REDUCED |
| Cu | | 0.005 | <0.002 | <0.002 | 0.006 | <0.002 | <0.002 |
| Ni | | 45.6 | 38.13 | 57.21 | 96.48 | 1.05 | 66.9 |
| Co | | 0.73 | 0.609 | 0.925 | 1.36 | 0.116 | 1.07 |
| Fe | | 0.13 | 0.21 | 0.22 | 0.31 | 0.22 | 0.23 |
| CaO | | 0.07 | 3.09 | 4.33 | <0.07 | 20.1 | 4.93 |
| $Al_2O_3$ | | 0.11 | 0.55 | 0.76 | 0.17 | 4.25 | 0.91 |
| MgO | | 2.41 | 1.93 | 2.95 | <0.02 | 22.8 | 3.4 |
| Si | | | | | 0.1 | | |
| $SiO_2$ | | 0.36 | 8.47 | 11.6 | | 52.3 | 13.4 |
| ICP S | | 4.02 | 3.4 | 0.04 | 0.17 | 0.09 | 0.04 |
| LECO S | | | 3.7 | 0.01 | 0.11 | 0.01 | <0.01 |
| Mn | | 0.04 | 0.03 | 0.04 | <0.01 | 0.18 | 0.05 |
| As | | <0.01 | <0.01 | <0.01 | <0.01 | <0.01 | <0.01 |
| Pb | | <0.01 | <0.01 | 0.02 | 0.02 | <0.01 | 0.02 |
| Zn | | <0.01 | <0.01 | <0.01 | <0.01 | <0.01 | <0.01 |
| Cr | | <0.01 | 0.01 | <0.01 | <0.01 | 0.04 | <0.01 |
| C | | | 1.77 | <0.01 | <0.1 | 0.02 | <0.01 |
| O | | | 46.6 | 25.4 | 0.07 | | 1.46 |
| P | | <0.010 | <0.01 | <0.01 | <0.01 | <0.01 | <0.01 |
| TOTAL: | | 49.5 | 105.1 | 103.5 | 98.6 | 101.1 | 92.4 |
| S removal, % | | | | 99.8 | | | |

In one example, a starting mix of pelletized NHP, 3% by weight bentonite, 3% by weight guar gum, 3% CaO and 6% SiO2, having an average diameter of 7 mm was calcined at 1390° C. for 30 minutes. The calcined pellets are hard and non-dusty, and consist of particles of nickel oxide completely encapsulated in a slag phase. The change in density of pre-fluxed NHP from dry green pellets to calcined pellets is summarized in Table II below.

TABLE II

| Pellet Description | Size Fraction | Density g/cm³ |
|---|---|---|
| NHP, dry green | 4-5.6 mm | 0.71 |
| NHP, calcined | 2-4 mm | 2.68 |
| NHP, calcined | 4-5 mm | 2.17 |

In one example, a mix of pelletized cobalt carbonate, 3% by weight bentonite, 3% by weight guar gum, having an average diameter of 7 mm was calcined at 1250° C. for 30 minutes. In another example, a mix of pelletized nickel carbonate, 3% by weight bentonite, 3% by weight guar gum, having an average diameter of 7 mm was calcined at 1250° C. for 30 minutes. Assay results on samples without flux addition are shown in Table III below.

calcining the dried agglomerates to produce a prefluxed metal oxide selected from the group consisting of nickel oxide, cobalt oxide and combinations thereof;
wherein the slag-making oxide is selected from the group consisting of MgO, CaO and combinations thereof.

TABLE III

| | | Cobalt carbonate | | | | Nickel carbonate | | |
|---|---|---|---|---|---|---|---|---|
| Test Number | | CoCarb-1 | | | | NiCarb-1 | | |
| Binder name | | bent + guar | | | | bent + guar | | |
| Binder quantity | Wt % on NHP | 3 + 3 | | | | 3 + 3 | | |
| Peak temperature | ° C. | | 1250 | 1550 | | | | 1250 |
| Dwell at peak temperature | h | | 1 | | | | | 1 |
| Atmosphere | | | $H_2/CO$ | air | | | | $H_2/CO$ |
| Assays, % | | AS-REC'D | GREEN | OX-RED | (melted) METAL | AS-REC'D | GREEN | OX-RED |
| Cu | | 0.022 | 0.016 | 0.032 | 0.04 | 0.002 | 0.003 | 0.006 |
| Ni | | 0.129 | 0.153 | 0.281 | 0.313 | 50.01 | 49.67 | 91.34 |
| Co | | 48.13 | 46.59 | 92.74 | 98.38 | 0.041 | 0.053 | 0.164 |
| Fe | | 0.63 | 0.71 | 1.38 | 0.74 | 0.02 | 0.20 | 0.19 |
| CaO | | 0.2 | 0.11 | 0.22 | 0.38 | <0.07 | 0.08 | <0.07 |
| $Al_2O_3$ | | <0.02 | 0.53 | 1.06 | <0.02 | 0.08 | 0.66 | 1.19 |
| MgO | | 0.02 | 0.13 | 0.20 | <0.02 | <0.02 | 0.08 | 0.13 |
| Si | | | | | | | | |
| $SiO_2$ | | 0.17 | 1.75 | 3.51 | 0.15 | 0.09 | 2.14 | 4.26 |
| LECO S | | | 0.22 | <0.01 | <0.01 | 0.27 | 0.22 | <0.01 |
| Mn | | 0.01 | 0.01 | 0.03 | <0.01 | <0.01 | <0.01 | <0.01 |
| As | | <0.01 | <0.01 | <0.01 | <0.01 | <0.01 | <0.01 | <0.01 |
| Pb | | <0.01 | <0.01 | <0.01 | <0.01 | <0.01 | <0.01 | 0.02 |
| Zn | | <0.01 | <0.01 | <0.01 | <0.01 | <0.01 | <0.01 | <0.01 |
| Cr | | 0.15 | 0.13 | 0.27 | <0.01 | <0.01 | <0.01 | <0.01 |
| Na | | 1.24 | 1.17 | 0.57 | | 0.002 | | |
| C | | | 6.50 | 0.07 | <0.02 | 4.22 | 5.56 | <0.005 |
| O | | | 42.4 | 2.94 | 0.02 | 46.2 | 41.5 | 2.14 |
| P | | | 0.01 | <0.01 | <0.01 | <0.01 | 0.02 | <0.01 |
| TOTAL: | | | | 100.36 | 100° | | | 97.30 |

* Co in metal by difference

The present process allows metal salts to be transformed into a strong granular, prefluxed metal oxide that is suitable for electric furnace smelting, or other suitable smelting vessel, to produce, e.g., nickel metal for the production of stainless steels. This pyrometallurgical approach to treat metal salt is potentially more cost effective and considerably simpler than traditional hydrometallurgical refining routes to provide nickel directly to the stainless steel industry.

While in accordance with the provisions of the statute, there are illustrated and described herein specific embodiments of the disclosure, those skilled in the art will understand that changes may be made in the form of the disclosure covered by the claims and that certain features of the disclosure may sometimes be used to advantage without a corresponding use of the other features. For example, the concentrations, temperature, time, flow, may be varied by those skilled in the art in accordance with conventional wisdom.

The embodiments of the invention in which an exclusive property or privilege is claimed are defined as follows:

1. A method for making a prefluxed metal oxide comprising:
   providing a slag-making oxide and a metal salt selected from the group consisting of nickel hydroxide, cobalt hydroxide, mixed nickel-cobalt hydroxide, nickel carbonate, cobalt carbonate, mixed nickel-cobalt carbonate and combinations thereof;
   blending the metal salt with a binder;
   blending in a flux additive to form a slag-making mixture;
   forming the mixture into agglomerates;
   drying the agglomerates; and 2. The method for making a prefluxed metal oxide according to claim 1 further comprising adding water to the slag-making mixture.

3. The method for making a prefluxed metal oxide according to claim 1, wherein the binder is selected from the group consisting of bentonite, lignin, guar gum, molasses, sugar, carboxymethylcellulose, cellulose, glycerol triacetate, polyethylene glycol, hydrolyzed starch, pregelatinized starch and combinations thereof.

4. The method for making a prefluxed metal oxide according to claim 1, wherein the binder is present in an amount ranging from about 2% to about 10% by weight.

5. The method for making a prefluxed metal oxide according to claim 1, wherein the flux additive is selected from the group consisting of a $SiO_2/CaO$ combination, a $SiO_2/Al_2O_3$ combination, and combinations thereof.

6. The method for making a prefluxed metal oxide according to claim 1, wherein the flux additive is proportional to the Mg, to the Ca, or to the combined Mg and Ca content of the slag mixture.

7. The method for making a prefluxed metal oxide according to claim 5, wherein the ratio of the $SiO_2/CaO$ combination is about 1.9 to about 2.2 parts $SiO_2$ to about 1 part CaO.

8. The method for making a prefluxed metal oxide according to claim 5, wherein the ratio of the $SiO_2/Al_2O_3$ combination is about 2 to about 2.5 parts $SiO_2$ to about 1 part $Al_2O_3$.

9. The method for making a prefluxed metal oxide according to claim 1, wherein the agglomerates are dried at a temperature ranging from about 90 ° C. to about 110 ° C.

10. The method for making a prefluxed metal oxide according to claim 1, wherein the agglomerates are calcined at a temperature ranging from about 1300 ° C. to about 1500 ° C.

11. The method for making a prefluxed metal oxide according to claim 1, wherein the agglomerates are selected from the group consisting of pellets, briquettes, granules and extrudates.

12. The method of making a prefluxed metal oxide according to claim 1, further comprising at least partially drying the metal salt prior to blending the metal salt with a binder.

13. The method of making a prefluxed metal oxide according to claim 1, wherein the agglomerates are dried and calcined in one vessel.

14. A method for making a prefluxed metal oxide comprising:
  providing a laterite leachate precipitate containing a metal salt selected from the group consisting of nickel hydroxide, cobalt hydroxide, mixed nickel-cobalt hydroxide, nickel carbonate, cobalt carbonate, mixed nickel-cobalt carbonate and combinations thereof;
  blending the precipitate with a binder;
  blending the precipitate with a flux additive to form a slag-making mixture with at least one slag-making oxide in the precipitate;
  forming the mixture into agglomerates; and
  calcining the agglomerates to produce a prefluxed metal oxide selected from the group consisting of nickel oxide, cobalt oxide and combinations thereof.

15. The method for making a prefluxed metal oxide according to claim 14 further comprising adding water to the slag-making mixture.

16. The method for making a prefluxed metal oxide according to claim 14, wherein the binder is selected from the group consisting of bentonite, lignin, guar gum, molasses, sugar, carboxymethylcellulose, cellulose, glycerol triacetate, polyethylene glycol, hydrolyzed starch, pregelatinized starch and combinations thereof.

17. The method for making a prefluxed metal oxide according to claim 14, wherein the flux additive is selected from the group consisting of a $SiO_2$/CaO combination, a $SiO_2$/$Al_2O_3$ combination, and combinations thereof.

18. The method for making a prefluxed metal oxide according to claim 14, wherein the slag-making oxide is selected from the group consisting of MgO, CaO and combinations thereof.

19. The method for making a prefluxed metal oxide according to claim 14 further comprising drying the agglomerates prior to calcining.

20. The method for making a prefluxed metal oxide according to claim 18, wherein the flux additive is proportional to the Mg, to the Ca, or to the combined Mg and Ca content of the slag mixture.

21. The method for making a prefluxed metal oxide according to claim 14, wherein the agglomerates are calcined at a temperature ranging from about 1300° C. to about 1500° C.

22. The method for making a prefluxed metal oxide according to claim 14, wherein the agglomerates are selected from the group consisting of pellets, granules, briquettes and extrudates.

23. The method of making a prefluxed metal oxide according to claim 14 further comprising at least partially drying the metal salt prior to blending the metal salt with a binder.

24. The method of claim 1, wherein:
  providing the slag-making oxide generates slag; and
  the prefluxed metal oxide is encapsulated in the slag.

\* \* \* \* \*